United States Patent Office 3,078,686
Patented Feb. 26, 1963

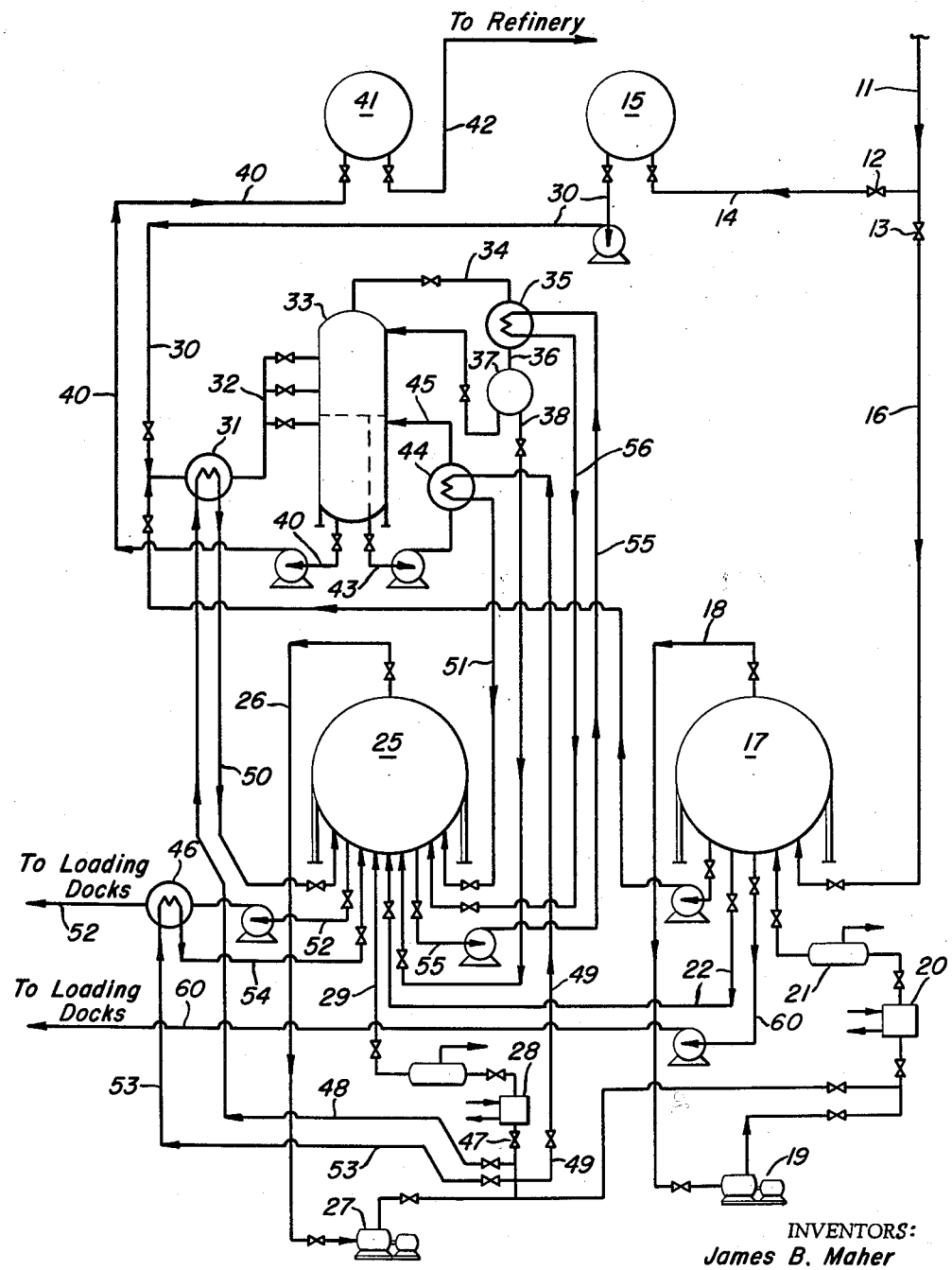

3,078,686
L-P GAS STORAGE AND SLOP
HANDLING SYSTEM
James B. Maher, Chicago, and Edward C. Gruner, Park Forest, Ill., assignors to Chicago Bridge & Iron Company, Chicago, Ill., a corporation of Illinois
Filed Apr. 6, 1960, Ser. No. 20,321
5 Claims. (Cl. 62—54)

This invention relates to a facility for the storage of normally gaseous, liquefied hydrocarbons or mixtures thereof. It is especially concerned with a storage system having facilities for handling and processing tenders of normally gaseous, liquefied hydrocarbons delivered from pipeline transportation facilities.

During the transportation of normally gaseous, liquefied petroleum products, conventionally referred to as L.P.G. through a pipeline, the leading and trailing edge of a "slug" or "tender" will have a relatively large amount of inter-facial mixing with the adjacent tender of, for example, gasoline. The effect of this mixing is that as much as 4,000 barrels of a 25,000 barrel tender may be of a quality that is less than the minimum specified for L.P.G. The off-specification product, or "slop mixture," as it is known in the art, may be composed of 50% LP-gas and 50% standard gasoline. Frequently in some pipeline operations, various expedinets are used to minimize this mixing effect, such as so-called "pigs" which are inserted at the interface between different product tenders. Such expedients, however, have not been very effective in limiting the formation of the "slop mixture" and the problems incidental to their use make them impractical for most operations.

Other problems in handling pipeline tenders of L.P.G. arise in providing storage facilities which can handle large tenders of product at fast filling rates. A type of facility which can handle this problem is described in a co-pending application entitled, "Storage of Liquefied, Normally Gaseous Products," filed by James B. Maher. In this storage system, which can also be used in conjunction with the instant invention, the product is received and initially stored at delivery conditions of elevated temperature and superatmospheric pressure. Thereafter the product is transferred at a slow rate to the final storage vessels. During the course of the transfer the product is refrigerated in order that it can be stored in the liquid state at about atmospheric pressure and subatmospheric temperatures.

Because there are a number of both state and federal regulations, promulgated in the public interest, which govern L.P.G. handling, storing and quality, off-specification product must be separated from the L.P.G. which is to be delivered to the ultimate consumer in order to conform with these regulations.

Waste disposal systems designed to separate the slop mixture are undesirable because of the marketable products which are wasted. Conventional fractionation systems are expensive to operate because of the cost of utilities in providing the necessary heat to operate the distillation processes.

In accordance with this invention the fractionation of slop mixtures and recovery of marketable components of the mixture can be economically effected employing a fractional distillation process wherein all of the heating and cooling requirements of the process are provided by the refrigeration system employed in the supplementary refrigerated storage system employed in storing the liquefied normally gaseous products.

At FIGURE 1 is a schematic flow diagram of one embodiment of the instant invention. There is illustrated therein a proceessing scheme employing this invention. In the diagrammatic presentation, valves, by-passes, pumps, and other equipment employed in an auxiliary capacity are not shown for the purposes of simplicity.

Referring to FIGURE 1, the product is fed to the storage terminal from a source such as a pipeline (not shown) through pipe 11. The leading and trailing edges of the tender which contain the slop mixture are transferred to storage by opening valve 12 and closing valve 13, and passing the mixture through line 14 into the slop storage 15. Suitable automatic sampling equipment is provided which in cooperation with an automatic valving arrangement controls the flow of product whereby the flow of on-specification product can be detected and the flow in line 11 can be diverted through line 16 to the primary pressurized storage vessel 17 by closing valve 12 and opening valve 13.

In vessel 17 the product is initially stored at the delivery conditions of elevated temperature and super-atmospheric pressure, e.g., as in the case of propane, 75° F. and 133 p.s.i.g. The necessary refrigeration to maintain these conditions is obtained by means of a vapor compression refrigeration system by removing the gaseous product effluent through line 18 and compressing it in compressor 19. The compressed vapor is condensed and liquefied in water-cooled condenser 20. The liquid product is purged of any incondensibles in purger 21 and returned to vessel 17 wherein it is flash vaporized to provide the necessary cooling.

If it is desired to transfer the on-specification product from vessel 17 to refrigerated storage vessel 25 without operating the fractional distillation system hereinafter described, the product is fed through line 22 into the refrigerated storage vessel 25 where the product is flash vaporized to a lower pressure thereby substantially lowering the temperature of the product. To maintain the product at a substantially constant temperature in the refrigerated vessel 25, line 26 is used to remove the gaseous product effluent and transfer it to compressor 27. The compressed vapor is passed to a suitable water-cooled condenser 28, where it is liquefied. The liquid product is returned via line 29 to the refrigerated sphere 25 wherein it is flash vaporized.

Usually, the fractional distillation system is operated in conjunction with the transfer of the product from the pressurized vessel 17 to the refrigerated vessel 25. In this system the slop mixture is taken from the slop storage tank 15 through line 30 into the feed heater 31. From there the heated product is transferred through line 32 to the fractionator 33. The overhead fraction, which is the L.P.G. portion of the slop material from the fractionator 33 is recovered through line 34 and passed to the condenser 35, wherein it condenses. The liquid product is transferred through line 36 into the accumulator 37 and a portion thereof returned to the fractionator 33 as reflux. The remainder of the overhead product is drawn from the accumulator 37 and sent through line 38 to the refrigerated vessel 25 for storage.

The bottoms fraction, or contaminating portion of the slop material, is drawn off through line 40 and transferred to the bottoms storage tank 41 from which it can be drawn through line 42 for further processing or consumer use. In order to supply the necessary heat for continuing the vaporization in fractionator 33, a conventional reboiler operation is employed. A side stream product is drawn from the fractionator 33 through line 43 into the reboiler 44. The reheated product is then returned to the fractionator 33 through line 45 in accordance with conventional techniques.

In accordance with this invention the refrigeration cycle used in the refrigeration of vessel 25 produces a quantity of heat equal to the latent heat of the product plus the heat of compression and the total heat is sufficient to provide the heat necessary to run the feed heater 31, the reboiler 44, and as required, product heater 46. When valve 47 is closed the compressed hot vapor is transferred through line 48 to the feed heater 31 and through line 49 to the reboiler 44. The vapor passing through these heat exchangers is condensed and the resultant liquid is transferred through lines 50 and 51 respectively to the refrigerated vessel 25. When the product is being unloaded through line 52, it is heated in the product heater by the hot vapor from compressor 27 which is transferred through line 53 and returns to refrigerated vessel 25 through line 54.

As an additional heat transfer feature of this invention the condenser 35 is provided with liquid coolant from the refrigerated product in vessel 25 which flows through line 55 and returns to the refrigerated vessel 25 via line 56. Because the coolant used is the stored product, the fractionator can be designed and operated at substantially less (about 50%) pressure than the conventional type which uses water as the heating and cooling medium.

In a specific embodiment of a storage and slop-handling system of this invention, a storage terminal having about 60,000 barrels capacity of propane is used. In addition, a total of about 100,000 gallons of storage is required for slop material and gasoline. The product is received into the terminal via pipeline. A quantity of 25,000 barrels is taken at 72-hour intervals. The 25,000 barrels come off the pipeline at a rate of 3,120 barrels per hour. Of the total incoming 25,000-barrel tender, as much as 4,000 barrels may be off-specification. This "slop material" for example is composed of 50% house-brand gasoline and 50% propane. Accordingly, the slop-handling system handles about 4,000 barrels of 50–50 slop mixture in a 3-day period. The load-out rate from the terminal may be as high as 347 barrels per hour or 25,000 barrels in three days.

In this system a 30,000-barrel sphere is employed for propane storage at 75° F.; a 30,000-barrel sphere for propane storage at 33° F.; ten 30,000-gallon slop propane and gasoline storage tanks for use in slop handling; and a low-pressure fractionator for slop material separation into regular gasoline and on-specification propane.

Two refrigeration systems are used, viz., a refrigeration plant of 170 tons capacity and a refrigeration plant of 20 tons capacity. In the former plant are two 65-ton compressors, and two 20-ton compressors (one as standby); as well as one entrainment separator, an oil separator for each compressor, condensers, a receiver and float valve assembly, and a purger.

The latter plant has two 10-ton compressors, (one as stand-by) an entrainment separator, oil separators, condensers, a receiver and float-valve assembly, and a purger.

Accessory vessels for the fractionator system include a feed heater, reboiler, condenser accumulator and three pumps.

In using the system, product from the pipeline is taken either directly into the 75° F. sphere or into the slop material tanks at a rate of 3,120 barrels per hour. If the propane is on specification it goes to the sphere; if not, the entire stream flows into slop tanks until non-contaminated product only is coming through.

The maximum temperature of the incoming pipe stream is about 75° F. The 75° F. sphere is designed for about 130 p.s.i., in order to take care of back pressure which will build up in the sphere as a result of rapid filling and condensation of vapor above the liquid.

Two 10-ton refrigeration units are provided for the 75° F. sphere. These units will hold the sphere and contents at 75° F. so that ambient heat-in leak to the sphere will not raise the temperature or pressure.

Propane can either be loaded from the 75° F. sphere to suitable loading docks or transferred to the 33° F. sphere for standing storage, viz., via line 60. The refrigeration plant of 170-ton capacity is provided for the 33° F. sphere. About 14 tons of this capacity are required to maintain the sphere and its contents at 33° F. on the warmest summer day. The remainder of the 170 tons is available to cool down product from 75° F. to 33° F. for transferring from the 75° F. sphere to the 33° F. sphere.

On the basis of full-time fractionator operation (about 4,000 barrels of slop per 3 days), the major portion of the refrigeration plant can be in continuous operation. The fractionator produces 4050 lbs. per hour (28.5 barrels per hour) of on-specification propane and 6571 lbs. per hour (30.5 barrels per hour) of regular gasoline. About 52.5 barrels per hour of 75° F. propane can be transferred from the 75° F. sphere to the 33° F. sphere; and a stream of as much as 192.5 barrels per hour from the 33° F. sphere to loading docks can be heated up from 33° F. to 50° F.

Product can be loaded out to docks from either the 75° F. or the 33° F. sphere. However, 33° F. product should be heated to about 50° F. before loading it to trucks for delivery to customers.

The fractionator cycle is as follows. The slop mixture feed is heated to 100° F. before entering the fractionator. The heat required for this is obtained by condensing compressed propane vapor from the refrigeration compressor discharge. From the feed heater, this condensed propane goes back to the 33° F. sphere. The vapor from the mixture and from the reflux is drawn off the top of the fractionator and condensed to liquid in a condenser. Propane liquid at 33° F. is pumped from the 33° F. sphere through the condenser where it is heated up to 65° F. and then back to the 33° F. sphere.

Part of the on-specification condensed vapor from the fractionator is used as reflux and the remainder is pumped either into 30,000-gallon propane tanks or back to the 75° F. sphere.

Heat required for the reboiler is obtained by condensing compressed propane vapor from the refrigeration compressor discharge. The condensed propane returns to the 33° F. sphere. The bottoms, or regular gasoline, are pumped from the fractionator into gasoline storage tanks. At appropriate intervals, the accumulated gasoline is loaded out to a gasoline buyer.

In addition to supplying heat for the feed heater and reboiler, some of the refrigeration compressor discharge is condensed in a product heater to heat up 33° F. propane from the 33° F. sphere before it proceeds to loading docks at 50° F.

The heat and refrigeration cycle is as follows: the fractionator condenser requires the removal of 1,844,248 B.t.u. per hour. Cold propane from the sphere picks up this quantity of heat and transfers it back to the sphere. This same quantity of heat is then removed from the sphere by taking vapor off the sphere, compressing the vapor, removing the heat of compression plus the latent heat by condensing compressed vapor and returning liquid to the sphere; the reboiler requires 1,782,550 B.t.u. per hour of heat, and the feed heater requires 444,772 B.t.u. per hour. This heat is obtained by condensing the compressor discharge before it is returned to the 33° F. sphere.

The cooling which is required to condense compressed vapor produced by the 190-ton refrigeration plant will be in excess of 190 tons (190 tons plus heat of compression). This cooling is sufficient to provide all the heat for the feed heater, reboiler, and the remainder will heat up a stream of 192.5 barrels per hour from 33° F. to 50° F. in a product heater located between the 33° F. sphere and the loading docks.

It is apparent that the type of insulation which is employed in insulating the various storage vessels employed in the storage system of this invention will have a direct effect on the refrigeration required to hold the tank at the desired operating conditions.

The storage system of this invention is adapted for use in the storage of a variety of liquefied, normally gaseous products such as propane, propylene, butanes, L.P.G. mixtures and the like. Modification in the storage facilities will be required for each system. However, such changes will be apparent to those skilled in the art to which this invention pertains. It is evident that automatic controls, indicating lights and alarms should be provided in order to increase the safety of the storage system. Refrigeration equipment, if possible, should be arranged in multiple units and sized for maximum conditions by manifolding the machines to permit interchangeable operations and maintenance can be facilitated if one of the units is shut down. Also, standby compressor capacity and electrical generating equipment should be provided in the event of normal electrical power failure.

Although the instant invention has been described with reference to the above specific examples, it is evident that variations and modifications will be apparent without departing from the scope of this invention. Accordingly, the foregoing detailed description has been given for clearness and understanding only, and no unnecessary limitations should be understood therefrom.

What is claimed is:

1. An integrated system for processing an admixture of normally gaseous, liquefied hydrocarbons and normally liquid hydrocarbons and storing normally gaseous, liquefied hydrocarbons which comprises a refrigerated storage facility including a first storage vessel for storing the liquefied petroleum gas at as-delivered conditions of temperature and pressure, a first vapor compression refrigeration means cooperating with said first storage vessel to maintain as-delivered storage conditions therein, a second storage vessel for storing liquefied, normally gaseous hydrocarbons at subatmospheric temperature, means for transferring the liquefied petroleum gas from said first vessel directly to said second vessel, means for flash vaporizing liquefied petroleum gas into said second vessel, a second vapor compression refrigeration means cooperating with said second vessel comprising compressor means and condenser adapted for compressing and liquefying gaseous effluent from said second vessel, means for transferring compressed gaseous effluent from said compressor means, outlet means on said second vessel for discharging said liquefied hydrocarbons for consumer use; a fractional distillation means for separating said admixtures, an indirect heat exchange feed heater for said distillation means, an indirect heat exchange reboiler for said distillation means, an indirect heat exchange product heater, means for transferring product from said second storage vessel through said product heater, conduit means for connecting said feed heater and reboiler to said distillation means, and conduit means for circulating the compressed gaseous effluent from said refrigeration means for indirect heat exchange in said feed heater, reboiler, and product heater.

2. An integrated system in accordance with claim 1 in which means are provided for returning liquefied product from said refrigeration means to said second storage vessel.

3. An integrated system for processing an admixture of normally gaseous, liquefied hydrocarbons and normally liquid hydrocarbons and storing normally gaseous, liquefied hydrocarbons which comprises a refrigerated storage facility including a first storage vessel for storing the liquefied petroleum gas at as-delivered conditions of temperature and pressure, a first vapor compression refrigeration means cooperating with said first storage vessel to maintain as-delivered storage conditions therein, a second storage vessel for storing liquefied, normally gaseous hydrocarbons at subatmospheric temperature, means for transferring the liquefied petroleum gas from said first vessel directly to said second vessel, means for flash vaporizing liquefied petroleum gas into said second vessel, a second vapor compression refrigeration means cooperating with said second vessel comprising compressor means and condenser means for compressing and liquefying gaseous effluent from said second vessel, means for transferring compressed gaseous effluent from said compressor means, means for returning liquefied product to said second storage vessel a fractional distillation means for separating said admixtures an indirect heat exchange feed heater for said distillation means, an indirect heat exchange reboiler for said distillation means, an indirect heat exchange product heater, means for transferring product from said second storage vessel through said product heater, conduit means for connecting said feed heater and reboiler to said distillation means and conduit means for circulating the compressed gaseous effluent from said refrigeration means for indirect heat exchange in said feed heater, reboiler, product heater, and indirect heat exchange, overhead effluent condenser means cooperating with said distillation means, and conduit means for circulating liquid product from said second vessel for indirect heat exchange in said condenser.

4. A method for processing sequential pipeline tenders of an admixture of liquefied normally gaseous hydrocarbons and normally liquid hydrocarbons, and storing liquefied, normally gaseous hydrocarbon which comprises receiving and storing said liquefied, normally gaseous hydrocarbon, refrigerating said liquefied, normally gaseous hydrocarbon and maintaining it at subatmospheric temperatures, recovering gaseous effluent product from the stored liquefied, normally gaseous hydrocarbon, compressing said gaseous effluent to produce a heated, compressed gaseous product, passing at least a portion of said heated gaseous product in indirect heat exchange with said admixture of liquefied, normally gaseous hydrocarbons and normally liquid hydrocarbon to heat said admixture to an elevated temperature sufficient to effect the fractional distillation of said admixture, fractionating said admixture in a fractional distillation zone to produce a gaseous overhead fraction consisting essentially of a liquefiable, normally gaseous hydrocarbon, an intermediate side stream, and a bottoms fraction consisting essentially of said normally liquid hydrocarbons, condensing said overhead fraction, passing said intermediate side stream in indirect heat exchange with at least a portion of said heated gaseous product and returning the reheated intermediate side stream to said fractional distillation zone, and recovering said bottoms fraction, and unloading a portion of the stored liquefied, normally gaseous hydrocarbon and passing the unloaded portion in indirect heat exchange with at least a portion of said heated gaseous product.

5. A method in accordance with claim 4 in which said overhead fraction is passed in indirect heat exchange with a portion of stored liquefied, normally gaseous hydrocarbon.

References Cited in the file of this patent

UNITED STATES PATENTS

| | | |
|---|---|---|
| 2,645,104 | Kniel | July 14, 1953 |
| 2,682,154 | Wilkinson | June 29, 1954 |
| 2,685,181 | Schlitt | Aug. 3, 1954 |
| 2,696,088 | Twomey | Dec. 7, 1954 |
| 2,762,208 | Dennis | Sept. 11, 1956 |
| 2,884,763 | Faulk | May 5, 1959 |
| 2,916,888 | Cobb | Dec. 15, 1959 |
| 2,944,406 | Anderson | July 12, 1960 |